(12) United States Patent
Riedl

(10) Patent No.: US 8,276,941 B2
(45) Date of Patent: Oct. 2, 2012

(54) HEIGHT ADJUSTABLE SUPPORT FOR SEMITRAILERS OR THE LIKE

(75) Inventor: Reinhold Riedl, Miltenberg (DE)

(73) Assignee: SAF-Holland GmbH, Bessenbach (DE)

( * ) Notice: Subject to any disclaimer, the term of this patent is extended or adjusted under 35 U.S.C. 154(b) by 763 days.

(21) Appl. No.: 12/377,070

(22) PCT Filed: Aug. 7, 2007

(86) PCT No.: PCT/EP2007/058194
§ 371 (c)(1),
(2), (4) Date: May 20, 2009

(87) PCT Pub. No.: WO2008/019973
PCT Pub. Date: Feb. 21, 2008

(65) Prior Publication Data
US 2010/0164213 A1    Jul. 1, 2010

(30) Foreign Application Priority Data

Aug. 14, 2006 (DE) .................... 20 2006 012 472 U

(51) Int. Cl.
B60S 9/08 (2006.01)
(52) U.S. Cl. .................. 280/766.1; 280/763.1

(58) Field of Classification Search .................. 280/762, 280/763.1, 764.1, 765.1, 766.1; 254/418, 254/419, 420, 424, 425, 427
See application file for complete search history.

(56) References Cited

U.S. PATENT DOCUMENTS

| 5,676,018 | A | 10/1997 | VanDenberg | |
| 2003/0006599 | A1* | 1/2003 | VanDenberg et al. | 280/766.1 |
| 2005/0110261 | A1* | 5/2005 | Belliveau | 280/764.1 |
| 2005/0173910 | A1* | 8/2005 | Riedl | 280/766.1 |
| 2006/0061078 | A1* | 3/2006 | Baxter | 280/763.1 |

FOREIGN PATENT DOCUMENTS

| DE | 19836635 | 2/2002 |
| EP | 0675029 | 10/1995 |
| EP | 1104369 | 6/2001 |
| WO | 2006/028859 | 3/2006 |

* cited by examiner

Primary Examiner — Hau Phan
Assistant Examiner — Bryan Evans
(74) Attorney, Agent, or Firm — Price Heneveld LLP

(57) ABSTRACT

A height-adjustable support (10) for semi-trailers or similar, comprising a locally fixed external support tube (13), an internal support tube (14), which is fixed to a nut (18) on a spindle (17), the spindle being driven by a change-over gear and a bevel gear assembly. The change-over gear has two gear wheel stages which can be alternately activated, a separate gear stage comprising bevel gear toothing being provided for the distribution of forces after each gear wheel stage.

29 Claims, 9 Drawing Sheets

Fig. 1
Fig. 2
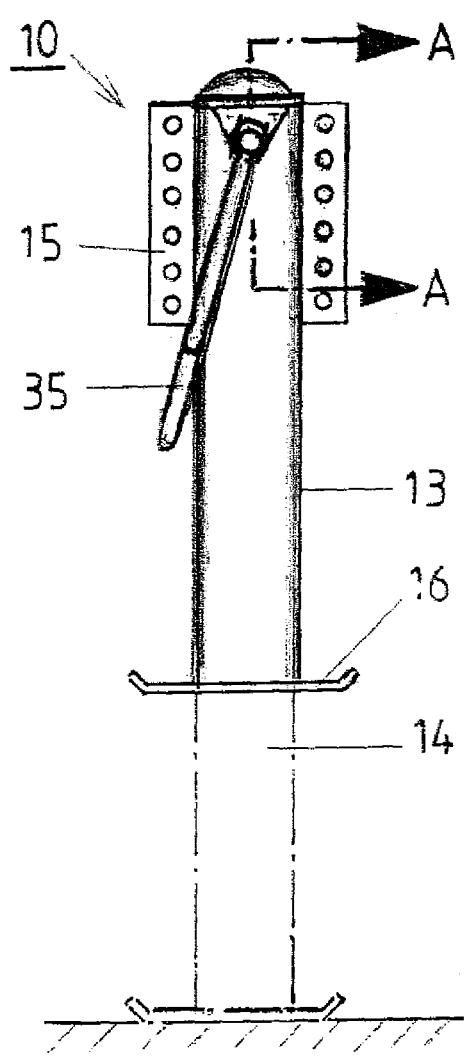
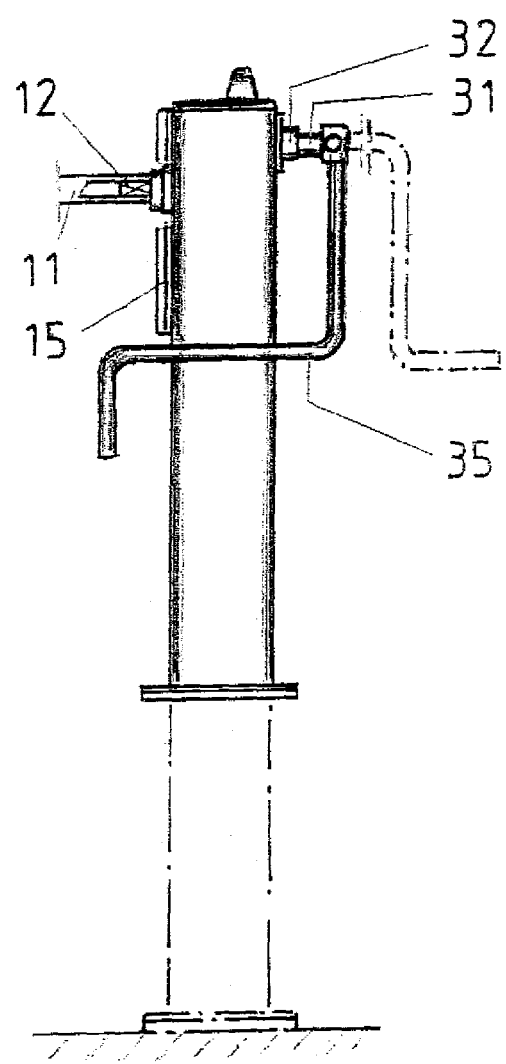

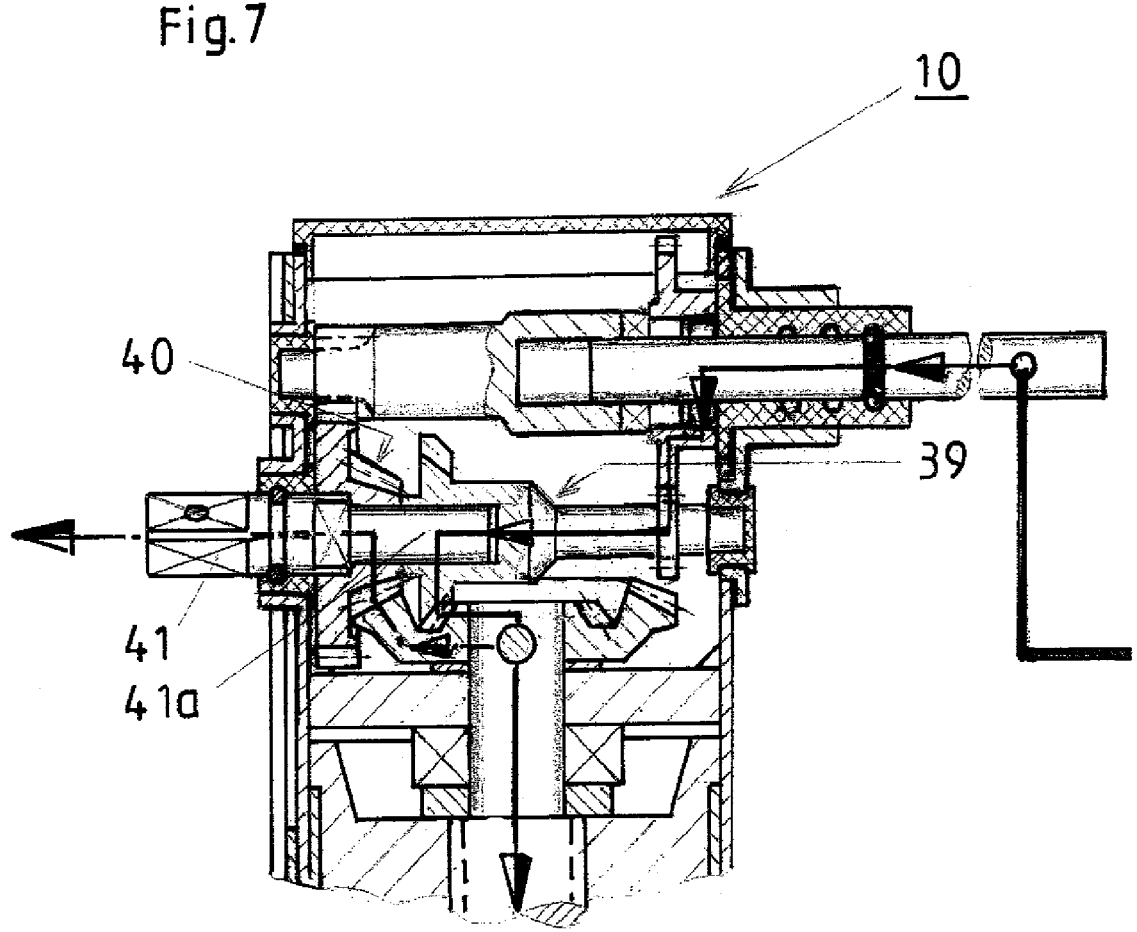

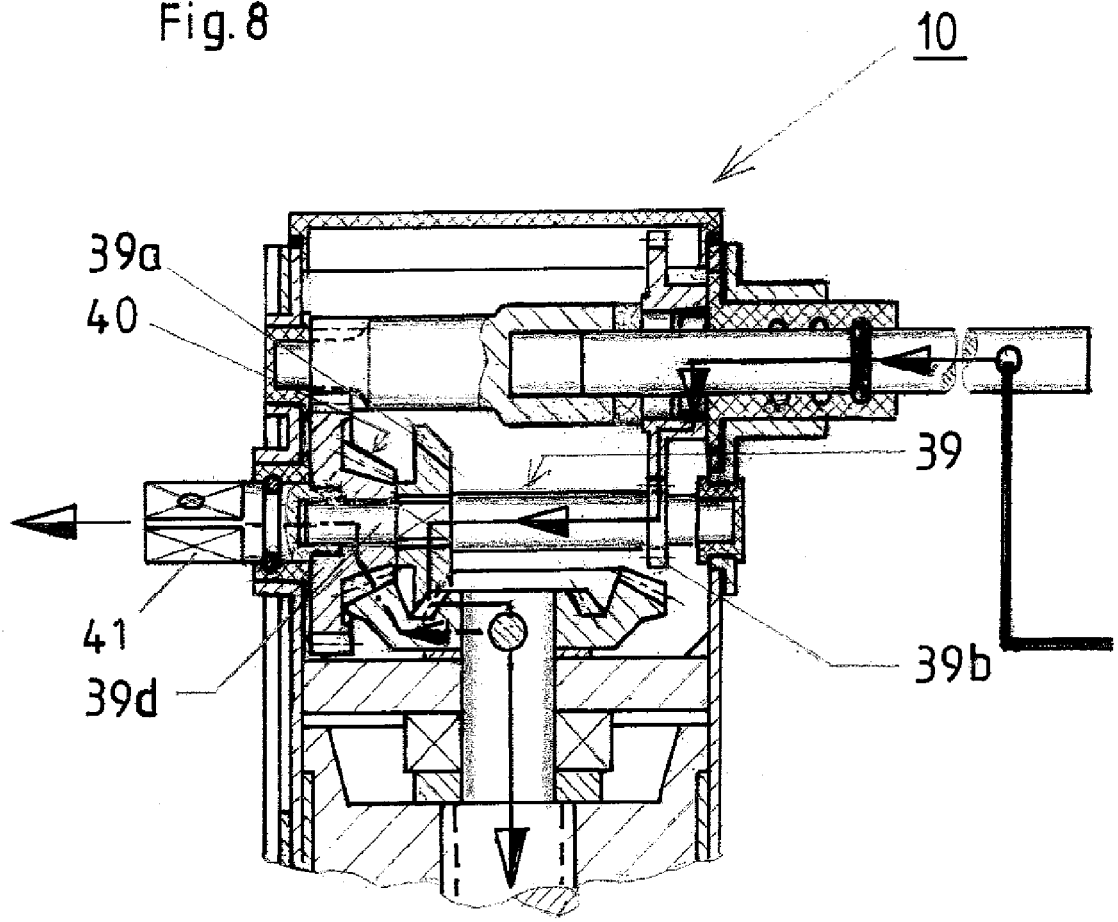

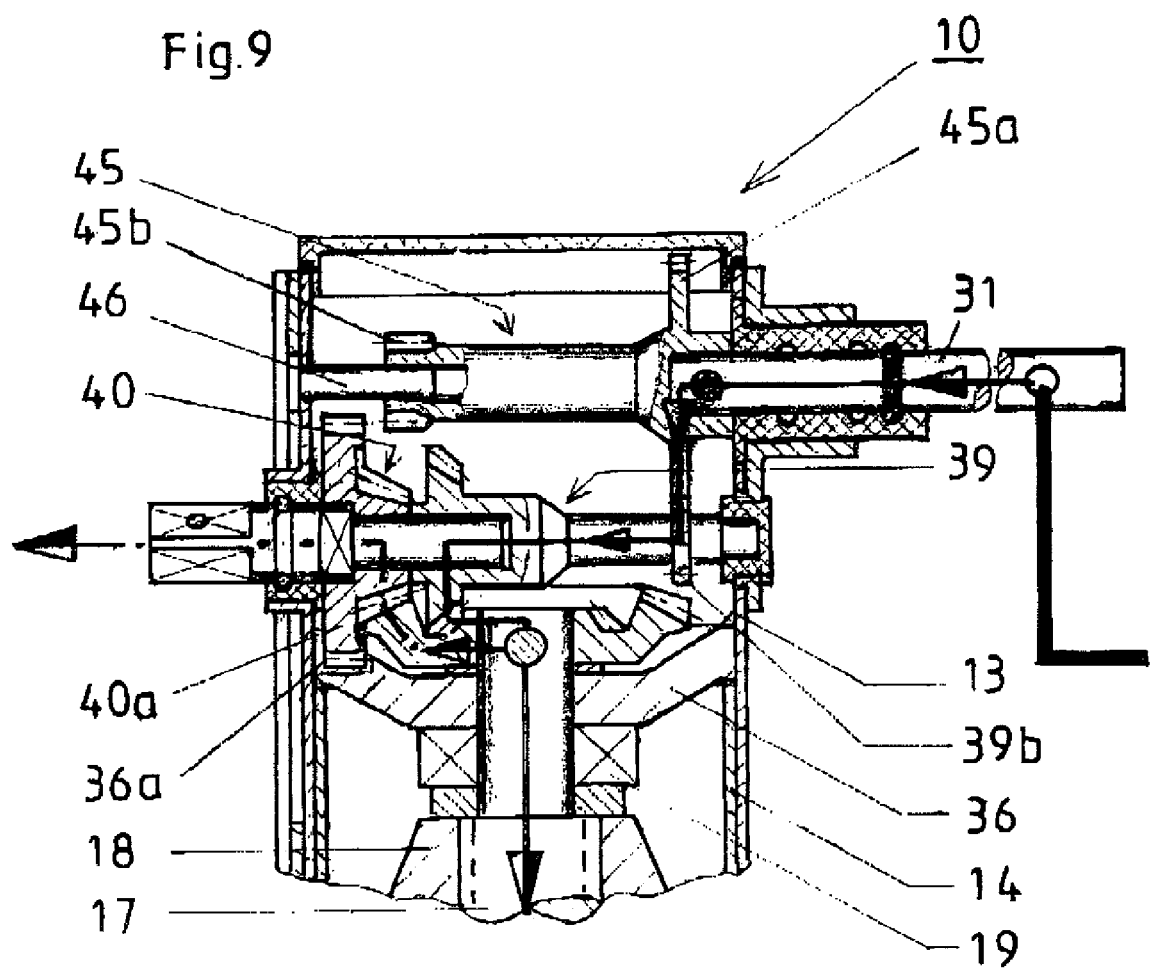

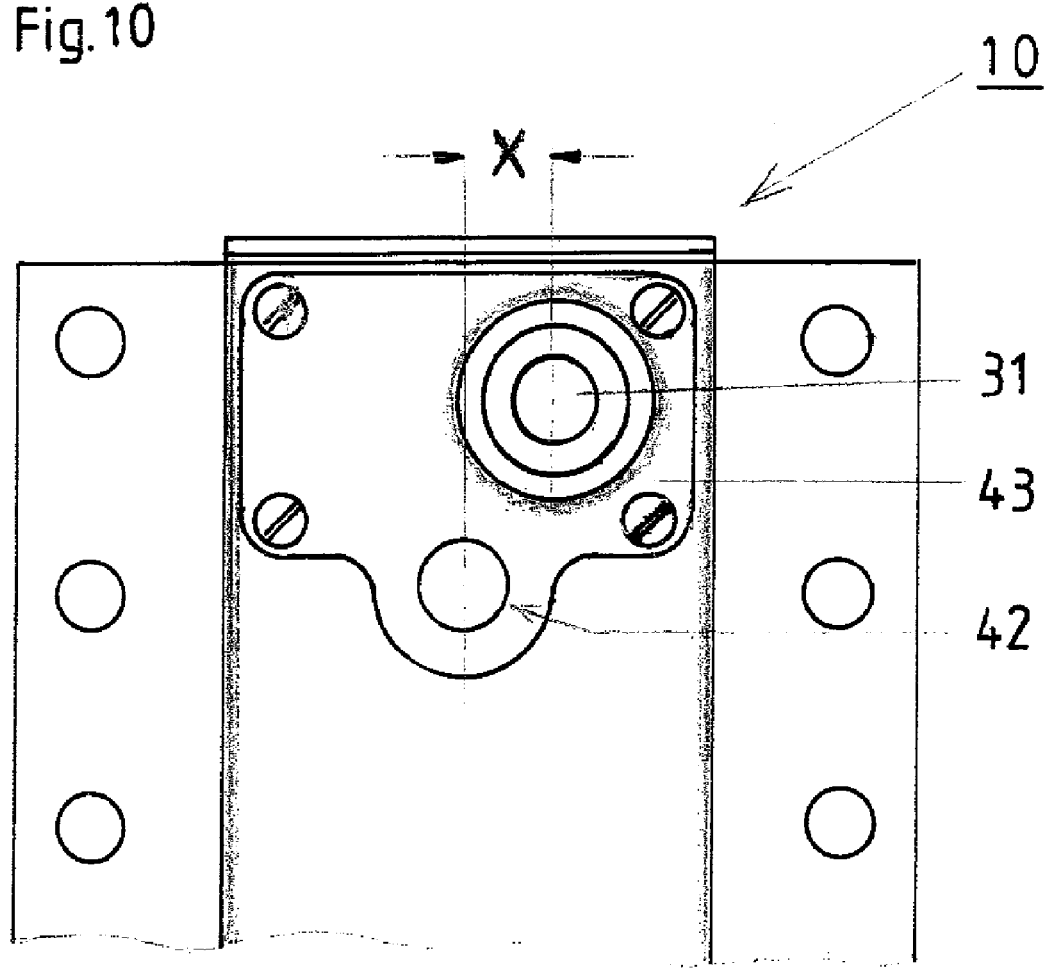

HEIGHT ADJUSTABLE SUPPORT FOR SEMITRAILERS OR THE LIKE

BACKGROUND OF THE INVENTION

The invention relates to a height-adjustable support for semitrailers or the like, comprising a locally fixed external support tube, an internal support tube, which is fixed to a nut on a spindle, the spindle being driven by a change-over gear and a bevel gear assembly. The change-over gear has two gear wheel stages which can be alternately activated, a separate gear stage comprising bevel gear toothing being provided for the distribution of forces after each gear wheel stage.

Supports of this type are disposed, generally in paired arrangement, as a supporting apparatus in the front region of the semitrailer.

An apparatus of this type is known from EP 0 675 0029. Here the speed-change gear mechanism is accommodated in a housing attached to the front of the support outer tube. The transmission input shaft and the transmission output shaft, on which the gearwheels are seated in a rotationally secure manner, are mounted respectively in the housing and in that wall of the support outer tube which lies opposite the housing. The transmission input shaft is in this case disposed below the bevel gear set, and alongside the spindle. The transmission output shaft is located above the ring gear, in whose upwardly directed toothing the bevel pinion seated in a rotationally secure manner on the transmission output shaft engages. The transmission input shaft can be rotated by means of a crank handle. The large gearwheel fitted on the transmission input shaft is provided in engagement with the smaller gearwheel, seated on the transmission output shaft, for a rapid height adjustment of the support; and the transmission generated by the pinion on the transmission input shaft with the large gearwheel on the gearwheel set of the transmission output shaft serves for the height adjustment of the support under load. Both in low-speed gear and in the faster height adjustment of this apparatus, the further power flow is effected via the bevel gear set to the spindle drive, and this apparatus is very bulky.

A pair of supports of the generic type is also known from EP 1 104 369 B1. The speed-change gear mechanism of this so-called apparatus for supporting the semitrailer of a truck tractor is disposed almost fully within the support, the transmission input shaft and the spindle disposed, for this purpose, outside the middle of the support being mounted in a common pillow block. The transmission input shaft and the transmission output shaft are mounted in a large cover, which is attached in protruding arrangement on the front wall of the support outer tube and which is also necessary to enlarge the installation space for the speed-change gear mechanism. The transmission input shaft arranged pointing to the spindle has a pinion, which engages in a large-diameter gearwheel of a gear set integral with the transmission output shaft and effects the transmission for a height adjustment under load. A further large-diameter gearwheel, which is mounted concentrically to the transmission input shaft, can be coupled and driven, following axial displacement of the transmission input shaft, by means of the pinion thereof. This latter large-diameter gearwheel hereupon engages in the pinion which belongs to the gear set of the transmission output shaft and via which the transmission for a faster adjustment of the support without load is realized. Disposed in a rotationally secure manner on the upper end of the spindle is a ring gear, in whose upward-pointing toothing the bevel pinion of the above-situated transmission output shaft engages. Here too, the bevel gear set is the second transmission stage both for the low-speed gear and for the faster adjusting process for the support.

In these known supports, it is particularly disadvantageous that behind the speed-change gear mechanism the power flow is effected always, i.e. both in the adjustment under load, the lifting process, and in the fast adjustment, the load-free height adjustment process, via one and the same bevel gear stage. Based on its large step-down ratio, the bevel gear stage is actually only fit for the lifting process. The result is that, in the previous transmission design for such supports, the speed increase attained via the step-up gear stage of the speed-change gear mechanism is very largely cancelled out by the step-down of the bevel gear set. And that the following spindle drive extends or retracts the support inner tube only at relatively moderate speed, even though this unsatisfactory process is referred to throughout the industry, for time-saving purposes, as the high-speed gear.

The object of the invention is to provide a height-adjustable support for semitrailers, which support has a particularly high high-speed gear in order to achieve a significant time gain, and in which all transmission parts are accommodated in the support outer tube without the need for a structural expenditure which enlarges the installation space.

SUMMARY OF THE INVENTION

This object is achieved according to the invention by the support according to the invention wherein it is proposed to provide a separate power transmission for high-speed gear operation from the speed-change gear mechanism into the spindle drive. For load operation, a first bevel gear set, as previously the norm, with step-down can be provided, which, together with the likewise speed-reducing speed-change gear mechanism stage before it and the spindle drive arranged after it, is ergonomically optimally designed with respect to the hand drive power. Regardless of this, the bevel gear set for the high-speed gear, on the other hand, is according to the invention particularly advantageously designed in terms of its transmission, if it has a substantially more direct transmission than the first-named bevel gear set. Thus in practice, for example, a transmission ratio of 1:1 already yields more than a doubling of the adjustment speed, with corresponding time savings compared with the traditional supports.

This design affords the possibility, in a superb manner, that the ring gears can be disposed above the transmission output shaft.

The transmission output shaft therefore no longer has to be led over the spindle and the ring gear, as previously, which, as a result of its consequently adverse height arrangement and predefined attachment height in the case of traditional supports, helps constructively to reduce the lift.

In a refinement, the invention provides a mounting support part, in which the transmission output shaft, as well as the spindle and a pinion unit installed therein, are jointly mounted. The transmission region of the support is hence made very compact.

According to the invention, the pinion unit to be disposed in the mounting support part preferably consists, in one-piece construction, of the pinion of the high-speed gear stage and the associated bevel pinion, as well as a small shaft. It is also conceivable, however, purely to connect the said pinions in a rotationally secure manner and to use for this purpose a small axle.

A gear unit of this kind can advantageously be inserted as a part from above into the mounting support and favorably requires no installation opening on the front side of the support.

According to another refinement according to the invention, the ring gear for the high-speed gear can be fastened on the spindle jointly with the ring gear for the low-speed gear, or the ring gear for the high-speed gear is fastened to the ring gear for the low-speed gear, which latter ring gear is fixed on the spindle.

The ring gear for the low-speed gear can also be provided with a second bevel gear toothing, corresponding to the ring gear for the high-speed gear, so that the latter ring gear is advantageously no longer required as a part.

And economically, the bevel toothings for the high-speed gear, because they are placed under less load, can be dimensioned smaller than those for the low-speed gear.

The four gearwheels of the speed-change gear mechanism are arranged such that the gearwheel and the pinion of the high-speed gear stage are disposed in front of, and the gearwheel with the pinion of the low-speed gear stage are disposed behind the spindle.

Because of this design according to the invention, the spindle can be centrally positioned and the advantageously short-length transmission output shaft can be disposed behind the spindle, pointing away therefrom.

If, according to the invention, the transmission input shaft is provided with preferably two radially protruding dogs as coupling means, these, after being appropriately engaged, can transport the large gearwheel, loosely mounted on the transmission input shaft, of the high-speed gear stage, or, for the low-speed gear, can transmit the torque to the pinion provided for this, and can also, in an intermediate setting, effect a freewheel. In this way, a cost-effective gearshift is realized.

The pinion of the low-speed gear stage of the speed-change gear mechanism is advantageously provided with a hollow shaft, in which the transmission input shaft can be mounted in an axially displaceable manner. Favorably, according to the invention, the necessary engagement regions for the dogs of the transmission input shaft can also be shaped on the hollow shaft of this pinion.

In an advantageous refinement of the invention, the transmission output shaft is preferably a part with square cross section and a cylindrical bearing journal and can be inserted in a positive-locking manner into the gearwheel/bevel gear stage, thereby greatly simplifying the assembly.

As another refinement of the invention, it is proposed to attach a motor in such a way to that support of a support pair which has no speed-change gear mechanism and is connected by a connecting shaft to the transmission output shaft of the support with speed-change gear mechanism, which latter support is drivable with a crank handle, that said motor can drive the hollow-shaft pinion.

Advantageously, a motorized drive of the support pair, for example for an automated hitching and unhitching operation with respect to truck tractors, is thereby enabled and manual operation can become the alternative for the special or emergency case.

In a bearing flange sleeve, three radial grooves are provided for the selective engagement of a ball spring element, seated in the transmission input shaft, for the purpose of locking the gearshift settings of the transmission input shaft.

In the engaged middle setting, in the aforesaid motorized operation, it is thus advantageously ensured that the speed-change gear mechanism of the manual drive remains in freewheel.

As another embodiment of the invention, for the separate high-speed gear power flow to the spindle drive, an intermediate drive unit having a toothed pinion as well as a bevel pinion is proposed, which shall be provided axially in front of a gearwheel and bevel pinion arrangement for the low-speed gear. Into the gearwheel and bevel pinion arrangement, on the support rear side, a transmission output journal can favorably be inserted positively from outside, by which the second support of a support pair can be driven.

The spindle with mounted ring gears, the toothings of which point upward, can here be stored in a bearing plate.

Advantageously, the transmission input shaft must be installed such that, in parallel arrangement to the intermediate drive unit, it extends only so far into the support outer tube as corresponds to the width of the large gearwheel of the high-speed gear and as its mounting depth in the hollow shaft pinion demands.

The gearwheel and bevel pinion arrangement for the low-speed gear can advantageously be shaped in one piece and provided with a bearing journal on which the intermediate drive unit can be mounted.

The bearing journal for the intermediate drive unit can also be provided as an extension on the transmission output shaft placed from behind through the gearwheel and bevel pinion arrangement, thereby facilitating the assembly.

It is advantageous to configure the intermediate drive unit in one piece such that it at one end receives a bearing bore, which is mounted on the bearing journal of the gearwheel/bevel pinion unit or on an extended transmission output journal, and at the other end is stored in the front region of the support.

The intermediate drive unit can also be shaped such that, instead of a bearing bore, it has a bearing journal, which is mounted in the gearwheel and bevel pinion arrangement for the low-speed gear or on the power-take-off journal, the bevel gear being fitted in a positive-locking manner, which produces a favorable means of assembly.

For a further embodiment of the support according to the invention, it is proposed to provide a gearwheel drive unit, which is disposed parallel to the intermediate drive unit and the gearwheel/bevel pinion unit and alternately transmits the power flow for the high-speed gear to the intermediate drive unit or, in low-speed gear, to the gearwheel/bevel pinion unit.

In preferably one-piece construction, the gearwheel drive unit, on one end region, can be configured with a large-diameter gearwheel for the high-speed gear operation and, at the other end, with a pinion for the low-speed gear.

The gearwheel drive unit can be connected in a rotationally secure and axially fixed manner to the transmission input shaft, which, in a manner appropriate thereto, must extend into the support outer tube by a still small extent than in the previously described embodiment. Apart from this connection and the thereby effected mounting of the gearwheel drive unit, it is advantageous to store the other side of the gearwheel drive unit displaceably on a bearing journal to be provided on the inner side of the rear wall of the support outer tube.

Through axial displacement of the transmission input shaft, the gearwheel drive unit is also correspondingly displaced and brought either into the high-speed gear or the low-speed gear, or in-between into neutral setting. In this embodiment, the unused gearwheel or pinion is respectively disengaged.

The support can advantageously also be provided with a bearing plate for the spindle, which bearing plate is cup-like and is preferably shaped with a square edge. At variance from the cup shape, individual edge regions may also be arranged taller.

If, moreover, the nut of the spindle drive is disposed in the support inner tube instead of over the support inner tube, the support inner tube can beneficially be extended upward to the point where its upper end face, in retracted setting, reaches up to directly against the bottom side of the edge of the proposed cup-like bearing plate.

If edge regions of the bearing plate are made taller, the side walls of the support inner tube, if stepped on the end face or provided with recesses, can also be correspondingly extended further upward. This gives rise to the possibility of building, according to the invention, supports with extremely low overall height and relatively large lift. In practice, this is advantageous with regard to ground clearance, especially in supports for large-capacity semitrailer units with low-lying frames. And in longer supports for higher vehicles, according to this embodiment there is a greater overlap of the support outer tubes with the support inner tubes, due to upwardly extended support inner tubes in the extended state. The increase in overlap favorably increases the transverse rigidity, and hence the operating reliability of the supports.

Finally, it proves favorable with regard to the gearwheel design if the transmission input shaft disposed above the intermediate drive unit of the high-speed gear is installed laterally offset from the intermediate drive unit.

BRIEF DESCRIPTION OF THE DRAWINGS

The invention is next explained with reference to the drawings, in which:

FIG. 1 shows a front view of the support according to the invention,

FIG. 2 shows a side view of the support shown in FIG. 1,

FIG. 7 shows a fifth longitudinal section analogous to FIG. 2, wherein the speed-change gear mechanism can be seen in the high-speed gear setting, FIG. 8 shows a sixth longitudinal section analogous to FIG. 2, wherein the speed-change gear mechanism can be seen in the high-speed gear setting, FIG. 9 shows a seventh longitudinal section analogous to FIG. 2, wherein the speed-change gear mechanism can be seen in the high-speed gear setting, FIG. 10 shows a front view of the upper support region.

DETAILED DESCRIPTION

Figure 3:
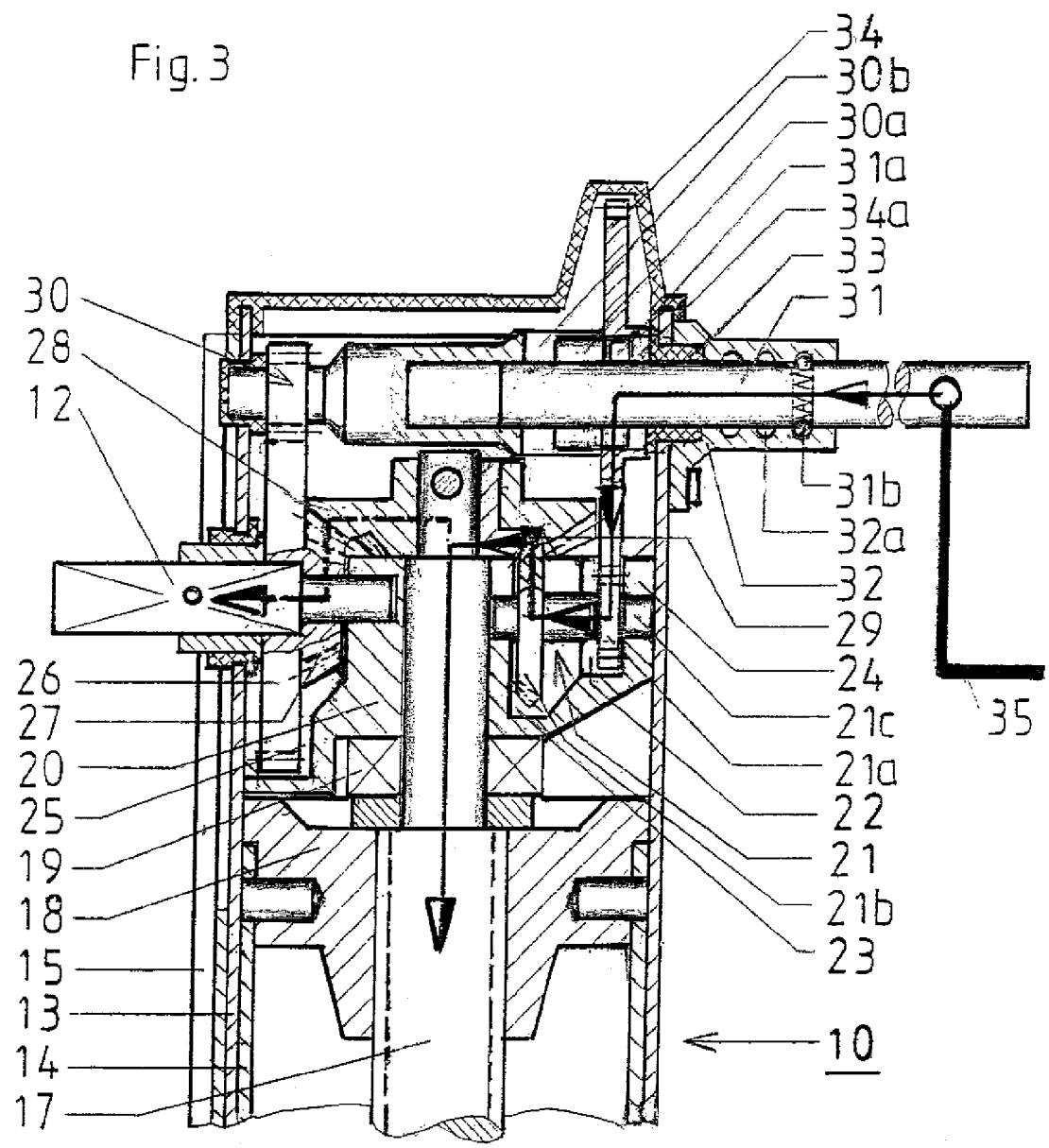
FIG. 3 shows a longitudinal section of the support shown in FIG. 1 along the line A-A, with the speed-change gear mechanism in the high-speed gear setting.

The support 10 shown in FIGS. 1 to 9 is fastened in paired arrangement to the chassis of a semitrailer in the front region thereof. The supports 10 of a pair are mutually connected by means of a connecting shaft 11 on the transmission output shafts 12 and in the transport setting are retracted, i.e. are in shortened state. And before the semitrailer is uncoupled from the tractor truck, they are extended.

The support 10 has a support outer tube 13, and a support inner tube 14 mounted in a longitudinally displaceable manner therein. The support outer tube 13 and the support inner tube 14 preferably have square cross sections. The support 10 is fastened to the semitrailer frame by a screw-on plate 15 seated on the support outer tube 13. Fastened to the lower end of the support inner tube 14 is a foot 16 for placement onto the ground. In addition, the support 10 has a spindle 17 with a nut 18.

As shown by FIGS. 1 to 4, seated on the spindle shoulder is an axial bearing 19, which is supported on a mounting support part 20 fastened in the support outer tube 13. In the mounting support part 20, the transmission output shaft 12, the spindle 17 and a pinion unit 21 are jointly mounted. The pinion unit 21 consists, in one-piece construction, of a pinion 21a, a bevel pinion 21b and a small shaft 21c. For the installation and mounting of the pinion unit 21, the mounting support part 20 has pockets 22, 23 and upwardly open bearing points 24. Likewise, the mounting support part 20 has a larger pocket 25 for the installation of a gearwheel 26 and of a bevel pinion 27 of the low-speed gear stage of the speed-change gear mechanism. On the mounting support part 20 are located a large ring gear 28 for the low-speed gear and a small ring gear 29 for the high-speed gear. The ring gears 28, 29 are jointly connected in a rotationally secure and axially non-displaceable manner to the journal of the spindle 17. The toothings of the ring gears 28, 29 point downward. The ring gear 28 meshes with the bevel pinion 27 seated below it on the transmission output shaft 12. And the bevel pinion 21b of the pinion unit 21 engages from below in the ring gear 29.

The short-length transmission output shaft 12 has a square cross section with a cylindrical bearing journal, can be easily inserted in a positive-locking manner into the gearwheel 26 connected to the bevel pinion 27 and, for the purpose of axial fixing, is pinned to a collar bushing. Axially parallel to the transmission output shaft 12 and above the ring gears 28, 29 there is disposed a hollow-shaft pinion 30, which engages in the gearwheel 26. The hollow-shaft pinion 30 is mounted on the rear side in the rear wall of the support outer tube, and supported coaxially in its hollow shaft is a longitudinally displaceable transmission input shaft 31, which has its second mounting in a bearing flange sleeve 32 seated on the front side of the support outer tube 13.

Located between the front end face of the hollow-shaft pinion 30 and a collar bushing 33 seated in the wall of the support outer tube 13 there is a gearwheel 34, which is mounted loosely on the transmission input shaft 31 and belongs to the high-speed gear stage of the speed-change gear mechanism. In the bore of the gearwheel 34 there are two axial grooves 34a, and the front region of the hollow-shaft pinion 30 has a cylindrical counterbore 30a and a continuous transverse slot 30b, corresponding to the width of the axial grooves 34a.

The transmission input shaft 31 has two radially protruding dogs 31a, which, following appropriate axial displacement of the transmission input shaft 31, can engage either in the axial grooves 34a or in the transverse slot 30b so as to be able to transmit the torque generated via a hinged crank handle 35 selectively to the high-speed gear or the low-speed gear stage of the speed-change gear mechanism. And if the dogs 31a are brought into the region of the counterbore 30a as an intermediate setting, a freewheel exists.

An axial locking of the transmission input shaft 31 against unwanted displacement during the cranking and to ensure that the manual drive mechanism, in motorized operation of a support pair, remains securely switched off, in the bearing flange sleeve 32 three radial grooves 32a are provided, into which a ball spring element 31b placed in the transmission input shaft 31 selectively engages.

Figure 4:
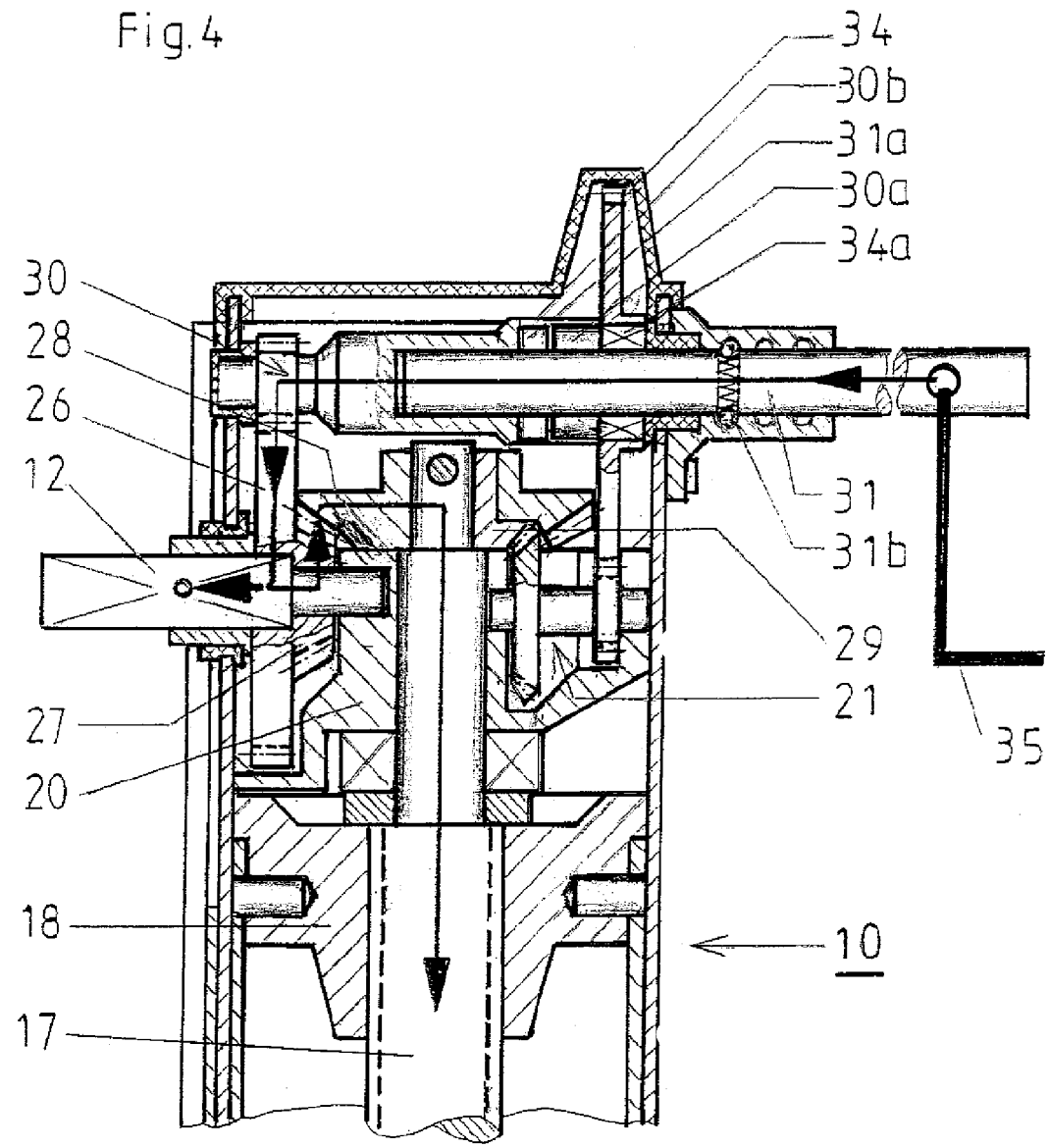
FIG. 4 shows a second longitudinal section analogous to FIG. 2, wherein the speed-change gear mechanism can be seen in the low-speed gear setting.

In order to illustrate the working of the speed-change gear mechanism, in FIG. 3 the power flow in high-speed gear is represented schematically in the form of arrowed lines. The dash-dot lines show the power take-off to the neighboring support. In the same way, the power flow in low-speed gear is shown in FIG. 4.

Figure 5:
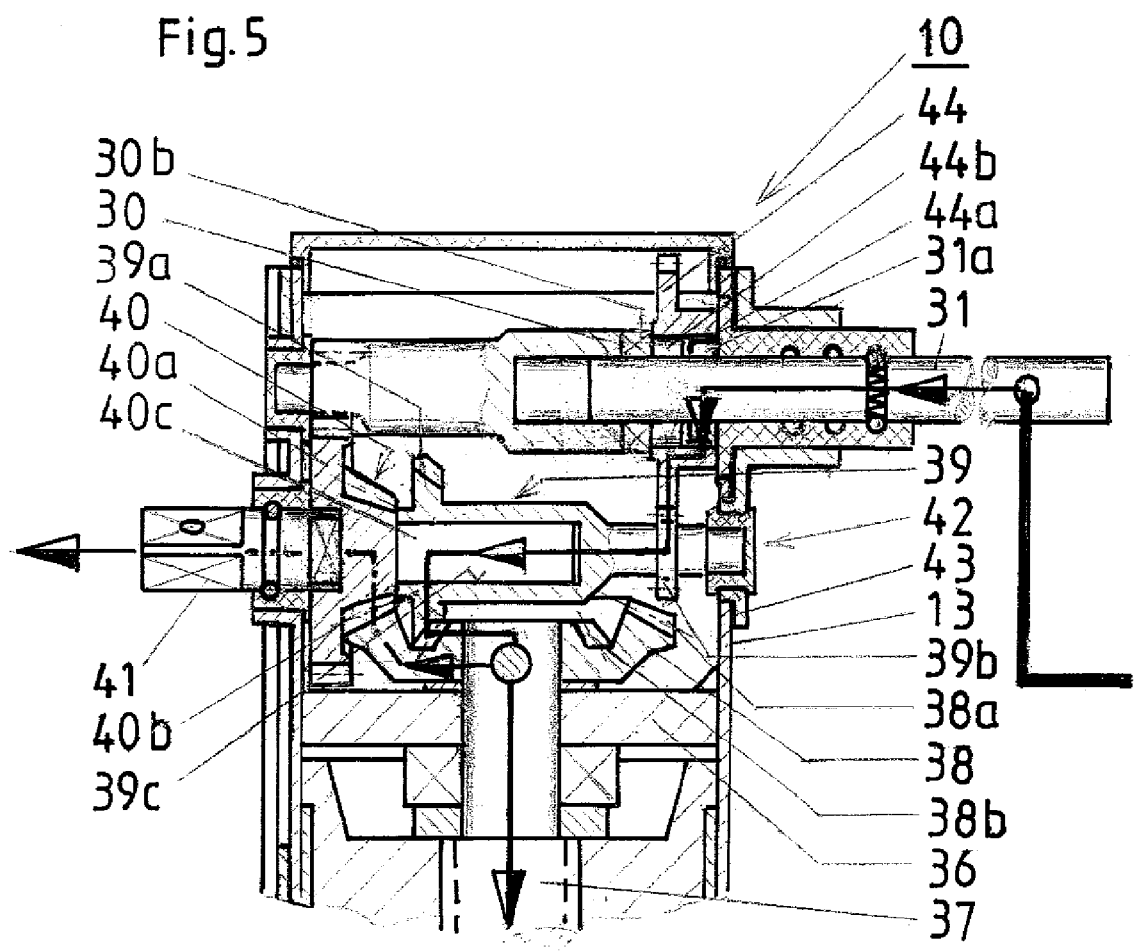
FIG. 5 shows a third longitudinal section analogous to FIG. 2, wherein the speed-change gear mechanism can be seen in the high-speed gear setting.

The support 10 according to the invention which is shown in FIG. 5, having a spindle 37 which is mounted in a bearing plate 36 and on which a ring gear 38 with two concentric toothings 38a/38b is seated, has an intermediate drive unit 39 for the high-speed gear and a gearwheel/bevel pinion unit 40 for the low-speed gear. The gearwheel/bevel pinion unit 40 consists of a gearwheel 40a and a bevel pinion 40b and is provided with a bearing journal 40c, on which the intermediate drive unit 39 is mounted rotatably in the bearing bore 39c. In the gearwheel/bevel pinion unit 40, axially opposite its bearing journal 40c, a transmission output journal 41 is inserted in a positive-locking and axially fixed manner, which also serves for the storage of said unit in the rear wall of the support 10.

The intermediate drive unit 39 consists of a hollow shaft, a bevel gear 39a being seated on the open side thereof and a pinion 39b being disposed on the oppositely adjoining region. The end piece of the intermediate drive unit 39 serves for the mounting 42 of the same in the front region of the support outer tube 13. The mounting 42 of the intermediate drive unit 39 is shaped such that, located in a cap 43, it projects into the outer tube 13 of the support 10.

On the transmission input shaft 31 there is a rotationally movable, large-diameter gearwheel 44 for the high-speed gear. The gearwheel 44 has on the inside, apart from axial grooves 44a for rotary transport by dogs 31a of the transmission input shaft 31, also a cylindrical counterbore 44b for the freewheel setting of the dogs 31a. The axial setting of the transmission input shaft 31 is represented in the high-speed gear setting. The force path in the high-speed gear setting is from the transmission input shaft 31 via the gearwheel 44 and the pinion 30b to the intermediate drive unit 39 and, via the bevel gear 39a thereof, to the toothing 38b of the ring gear 38 to the spindle drive (see arrow line in FIG. 5).

At the same time, a part of the torque is transferred from the ring gear 38 via its toothing 38a to the bevel pinion 40b, and via the transmission power take-off journal 41 and the connecting shaft 11 (see FIG. 1) to the neighboring support (see dash-dot arrow line in FIG. 5). In this embodiment of the support 10, the hollow-shaft pinion 30 is provided on the end face of the hollow shaft merely with transverse slots 30b, in which, after the transmission input shaft 31 has been switched over, its dogs 31a engage and the low-speed gear is realized in the manner described earlier.

Figure 6:
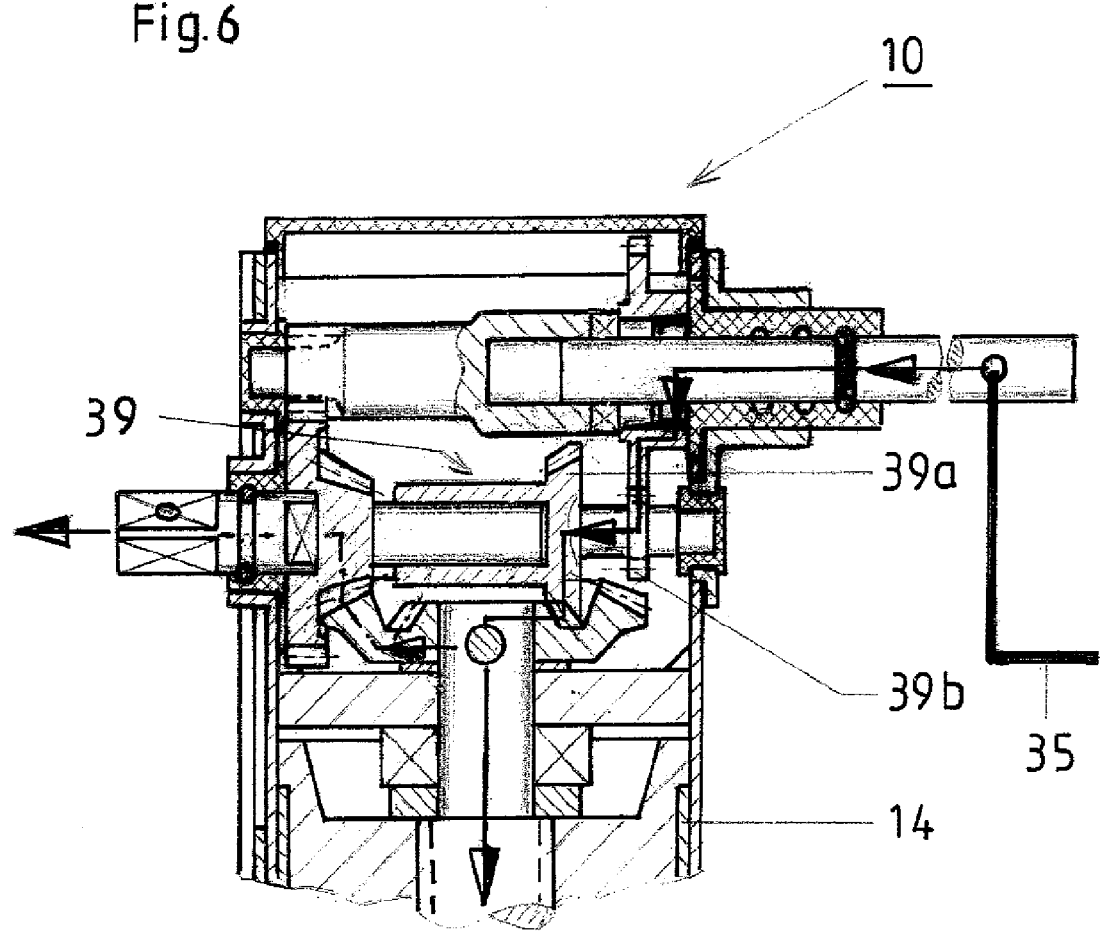
FIG. 6 shows a fourth longitudinal section analogous to FIG. 2, wherein the speed-change gear mechanism can be seen in the high-speed gear setting.

In the support 10 shown in FIG. 6, in contrast to that shown in FIG. 5, the bevel gear 39a of the intermediate drive unit 39 is located on the other end region of its hollow shaft. In functional terms, this embodiment therefore advantageously differs from the semitrailer supports presently on the market by virtue of an opposite drive rotational direction of the high-speed gear and the low-speed gear. The direction of rotation of the crank handle 35 can namely be formulated in high-speed gear, i.e. without load when the support inner tube 13 is extended (let out), such that cranking can perforce easily be carried out counterclockwise. By contrast, the retraction (drawing-in) of the support inner tube 13, at perforce higher necessary cranking pressure in the clockwise direction, can be cranked more comfortably. On the other hand, in low-speed gear, the extension of the support inner tube 13, i.e. the raising of the load, can continue to be well realized, as previously, rotating in the clockwise direction. The power flow in high-speed gear is represented with arrow lines or dash-dot lines in FIG. 6.

In FIG. 7, a support 10 is shown in which, unlike in FIG. 5, the transmission output journal 41 is provided with a bearing journal 41a, which is placed in a positive-locking manner partially in the gearwheel/bevel pinion unit 40 and on which, moreover, the intermediate drive unit 39 is rotatably mounted. The working is described as for FIG. 5.

FIG. 8 shows a support 10 according to FIG. 5, yet with an intermediate drive unit 39 which is fully cylindrical and has a second bearing journal 39c, which is mounted rotatably in the gearwheel/bevel pinion unit 40 and the transmission output journal 41. And the bevel gear 39a is mounted in a rotationally secure manner. The working is described as for FIG. 5.

The support 10 shown in FIG. 9 has a gearwheel drive unit 45, which has a gearwheel 45a and a pinion 45b. The gearwheel drive unit 45 is on one side, seated on the transmission input shaft 31, connected to this in a rotationally secure and axially coupled manner by pinning. And the other side of the gearwheel drive unit 45 is mounted in an axially displaceable manner on a bearing journal 46, which is seated on the inner side of the rear wall of the support outer tube 13. In high-speed gear of the support 10, the gearwheel 45a of the gearwheel drive unit 45 meshes with the pinion 39b of the intermediate drive unit 39 and the power flow takes place according to the arrow lines included in FIG. 9. If the transmission input shaft 31, for the purpose of shifting to the low-speed gear, is pushed in as far as possible, the pinion 45b of the intermediate drive unit 39 enters into engagement with the gearwheel 40a of the gearwheel/bevel pinion unit 40 and the power flow can then be realized according to the previously described embodiments. In an axial intermediate setting of the gearwheel drive unit 45, the gearwheel 45a and the pinion 45b are disengaged, which corresponds to the neutral gearshift.

FIG. 9 additionally shows the bearing plate 36 in a cup-like configuration, in an edge region a recess 36a being provided, into which the gearwheel 40a extends. The edge of the cup-like bearing plate 36 is welded to the support outer tube 13. The support inner tube 14 extends, in its transport setting which is shown here, to right up to the lower region of the edge of the cup-shaped bearing plate 36. The nut 18 is fixed in the support inner tube 14 in a manner which is not shown.

Finally, FIG. 10 shows an embodiment of the support, in which the transmission input shaft 31 disposed above the intermediate drive unit 39 of the high-speed gear is installed laterally offset from the intermediate drive unit 39 by, for example, a measure X.

The invention claimed is:

1. A height-adjustable support for semitrailers, comprising a fixed-mounted support outer tube, a support inner tube, which is disposed in a height-adjustable manner within the support outer tube and is fastened to a nut present on a spindle, the spindle is drivable via a speed-change gear mechanism and a bevel gear arrangement, the speed-change gear mechanism comprises two gearwheel stages which are alternately engageable, wherein, for power flow after each gearwheel stage of the speed-change gear mechanism, a separate transmission stage with bevel gear toothings is present, wherein the separate transmission stage comprise bevel gear pairs, including a first bevel pinion with a first ring gear and a second bevel pinion with a second ring gear, wherein toothings of the ring gears point axially downward.

2. The support as claimed in claim 1, wherein at least one of the ring gears is disposed above a transmission output shaft.

3. The support as claimed in claim 1, wherein the transmission has an output shaft wherein the output shaft; the spindle, and a pinion unit, are jointly mounted in a mounting support part.

4. The support as claimed in claim 3, wherein pockets, as well as bearing points which are open at the top, are present in the mounting support part.

5. The support as claimed in claim 3, wherein the pinion unit is installed in the mounting support part.

6. The support as claimed in claim 3, wherein the pinion unit comprises, in one-piece construction, a pinion and a bevel pinion, a shaft, and has a loose axle.

7. The support as claimed in claim 1, wherein the speed-change gear mechanism comprises a high-speed gear stage and a low-speed gear stage, each having a gearwheel and a pinion, wherein the gearwheel and the pinion of the high-speed gear stage is disposed in front of an axle of the spindle, and the gearwheel and the pinion for the low-speed gear stage being disposed behind the axle of the spindle.

8. The support as claimed in claim 1, wherein a transmission output shaft is disposed behind the spindle.

9. The support as claimed in claim 7, wherein a hollow-shaft pinion has an input shaft of the transmission stage mounted thereon and on an end region of which a cylindrical counterbore, as well as a continuous transverse slot, is provided.

10. The support as claimed in claim 9, wherein the transmission input shaft has radially protruding dogs, which serve as coupling parts of the transmission input shaft and are selectively engaged with the gearwheel of the high-speed gear stage equipped with axial grooves, or with the hollow-shaft pinion.

11. The support as claimed in claim 1, wherein an output shaft of the transmission stage has a predominantly square cross section, which is seated in a positively locking manner in a gearwheel of one of the gearwheel stages and is axially fixed by means of a collar bushing.

12. The support as claimed in claim 7, wherein a motor is attached to a support connected by means of a connecting shaft, such that said motor can drive the hollow-shaft pinion.

13. The support as claimed in claim 1, wherein the ring gear of one bevel gear pair is embedded in the ring gear of the other bevel gear pair and both ring gears are fastened by means of just one fastening element jointly on a journal of the spindle.

14. The support as claimed in claim 1, wherein the ring gears of the bevel gear pairs are mutually connected and are fastened to the spindle.

15. The support as claimed in claim 1, wherein an intermediate drive unit is disposed axially in front of a bevel gear pair.

16. A height-adjustable support for semitrailers, comprising:
a fixed-mounted support outer tube, a support inner tube, which is disposed in a height-adjustable manner within the support outer tube and is fastened to a nut present on a spindle, the spindle is drivable via a speed-change gear mechanism, an intermediate drive unit and a bevel gear arrangement, the speed-change gear mechanism comprising two gearwheel stages which are alternately engageable, wherein, for power flow after each gearwheel stage of the speed-change ear mechanism a separate transmission stage with bevel gear toothings is present, wherein the intermediate drive unit is in one piece and of a hollow shaft with a bearing bore, on the open end region whereof a bevel gear is seated and on the oppositely adjoining region whereof a pinion is disposed, which pinion is adjoined by a bearing journal, extending from the mounting of the intermediate drive unit in a front region of the outer support outer tube.

17. The support as claimed in claim 16, wherein the intermediate drive unit has a bearing journal which serves for the mounting of the intermediate drive unit in a gearwheel/bevel pinion unit and/or in a transmission output journal, and in that a bevel gear is fitted in a positively locking manner.

18. The support as claimed in claim 17, wherein the bevel gear is disposed in front of or behind the axle of the spindle.

19. The support as claimed in claim 17, wherein the transmission output journal is inserted in the gearwheel/bevel pinion unit.

20. The support as claimed in claim 17, wherein the transmission input shaft mounted in a hollow-shaft pinion extends into the support outer tube only to within a longitudinal region of the intermediate drive unit.

21. The support as claimed in claim 17, wherein the gearwheel/bevel pinion unit is disposed behind the spindle.

22. The support as claimed in claim 17, wherein the gearwheel/bevel pinion unit has a bearing journal on which the intermediate drive unit is mounted.

23. The support as claimed in claim 17, wherein the transmission output journal has a bearing journal on which the intermediate drive unit is mounted.

24. The support as claimed in claim 17, wherein a gearwheel drive unit is connected to a transmission input shaft and has a gearwheel and a pinion, the gearwheel drive unit is disposed parallel to the intermediate drive unit and the gearwheel/bevel pinion unit.

25. The support as claimed in claim 24, wherein the gearwheel drive unit is mounted in an axially displaceable manner on an inner side of a rear wall of the support outer tube.

26. The support as claimed in claim 1, including a cup-shaped bearing plate, wherein the nut is disposed in the support inner tube.

27. The support as claimed in claim 26, wherein the bearing plate has edge regions of different height.

28. The support as claimed in claim 1, wherein the support inner tube is of a length such that all side wall regions of an upper end, in the retracted setting of the support inner tube, are arranged higher in the support outer tube than an axial bearing of the spindle.

29. The support as claimed in claim 9, wherein the transmission input shaft is disposed above an intermediate drive unit of the high-speed gear stage and is installed laterally offset from the intermediate drive unit.

* * * * *